(12) United States Patent
Yonemori et al.

(10) Patent No.: US 11,760,679 B2
(45) Date of Patent: Sep. 19, 2023

(54) FLOAT GLASS PRODUCTION DEVICE AND FLOAT GLASS PRODUCTION METHOD

(71) Applicant: AGC INC., Tokyo (JP)

(72) Inventors: Haruo Yonemori, Tokyo (JP); Nobuyuki Ban, Tokyo (JP); Akira Ueno, Tokyo (JP); Takenori Miura, Tokyo (JP)

(73) Assignee: AGC INC., Tokyo (JP)

( * ) Notice: Subject to any disclaimer, the term of this patent is extended or adjusted under 35 U.S.C. 154(b) by 239 days.

(21) Appl. No.: 17/098,194

(22) Filed: Nov. 13, 2020

(65) Prior Publication Data

US 2021/0061697 A1  Mar. 4, 2021

Related U.S. Application Data

(63) Continuation of application No. PCT/JP2019/019006, filed on May 13, 2019.

(30) Foreign Application Priority Data

May 17, 2018 (JP) .................................. 2018-095629

(51) Int. Cl.
| | | |
|---|---|---|
| C03B 18/20 | (2006.01) |
| C03B 25/08 | (2006.01) |
| C03B 35/16 | (2006.01) |
| C03B 18/16 | (2006.01) |

(52) U.S. Cl.
CPC .............. *C03B 18/16* (2013.01); *C03B 18/20* (2013.01); *C03B 25/08* (2013.01); *C03B 35/16* (2013.01)

(58) Field of Classification Search
CPC ................................. C03B 18/02; C03B 25/08
See application file for complete search history.

(56) References Cited

U.S. PATENT DOCUMENTS

| | | | | |
|---|---|---|---|---|
| 3,506,422 A * | 4/1970 | Walters | .................... | C03B 18/02 65/32.5 |
| 3,754,880 A * | 8/1973 | Henderson | ............ | C03B 35/168 65/173 |
| 3,801,412 A * | 4/1974 | Brichard | ................. | C03B 18/22 65/193 |

(Continued)

FOREIGN PATENT DOCUMENTS

| | | | | | |
|---|---|---|---|---|---|
| CN | 101652329 A | * | 2/2010 | ............. | C03B 35/16 |
| CN | 102046542 A | * | 5/2011 | ............. | C03B 25/08 |

(Continued)

OTHER PUBLICATIONS

International Searching Authority, "International Search Report," issued in connection with International Patent Application No. PCT/JP2019/019006, dated Jul. 30, 2019.

(Continued)

*Primary Examiner* — Galen H Hauth
*Assistant Examiner* — Steven S Lee
(74) *Attorney, Agent, or Firm* — Foley & Lardner LLP

(57) ABSTRACT

The present invention relates to a float-glass manufacturing apparatus including a float bath and a heat treatment furnace, in which the heat treatment furnace includes: a dross box including a plurality of lift-out rolls; an annealing furnace including a plurality of lehr rolls; a first partitioning part; a second partitioning part; a gas ejection nozzle; and a guide member.

16 Claims, 9 Drawing Sheets

(56) References Cited

U.S. PATENT DOCUMENTS

| | | | | |
|---|---|---|---|---|
| 10,399,894 | B2 * | 9/2019 | Hotta | C03C 21/002 |
| 2014/0260429 | A1 * | 9/2014 | Kim | C03B 25/08 65/25.3 |
| 2016/0236960 | A1 * | 8/2016 | Tanii | C03B 18/18 |

FOREIGN PATENT DOCUMENTS

| | | | | | |
|---|---|---|---|---|---|
| CN | 102108006 | A | | 6/2011 | |
| CN | 104261655 | A | | 1/2015 | |
| CN | 104768884 | A | * | 7/2015 | ............ C03B 18/02 |
| CN | 105384326 | A | * | 3/2016 | ............ C03B 18/02 |
| CN | 105612130 | A | * | 5/2016 | ............ C03B 18/04 |
| CN | 106064878 | A | * | 11/2016 | ............ C03B 18/02 |
| DE | 102007009495 | A1 | * | 8/2008 | ............ C03B 18/02 |
| FR | 2570690 | A1 | * | 12/1986 | ............ C03B 18/02 |
| JP | 2011121834 | A | * | 6/2011 | ............ C03B 18/18 |
| JP | 5223861 | B2 | | 6/2013 | |
| JP | 5387920 | B2 | | 1/2014 | |
| JP | 2015160804 | A | * | 9/2015 | ............ C03B 18/14 |
| JP | 2016-020282 | A | | 2/2016 | |
| JP | 2016020282 | A | * | 2/2016 | ............ C03B 25/08 |
| JP | 2016-050160 | A | | 4/2016 | |
| WO | WO-2008068965 | A1 | * | 6/2008 | ............ C03B 18/14 |
| WO | WO-2012066889 | A1 | * | 5/2012 | ............ C03B 25/08 |
| WO | WO-2013/061793 | A1 | | 5/2013 | |
| WO | WO-2013061793 | A1 | * | 5/2013 | ............... B08B 1/00 |

OTHER PUBLICATIONS

International Searching Authority, "Written Opinion," issued in connection with International Patent Application No. PCT/JP2019/019006, dated Jul. 30, 2019.

European Extended Search Report, dated Feb. 2, 2022, issued in corresponding European Patent Application No. 19802834.2, (9 pages).

* cited by examiner

FLOAT GLASS PRODUCTION DEVICE AND FLOAT GLASS PRODUCTION METHOD

CROSS-REFERENCE TO RELATED APPLICATIONS

This is a bypass continuation of International Patent Application No. PCT/JP2019/019006, filed on May 13, 2019, which claims priority to Japanese Application No. 2018-095629, filed on May 17, 2018. The contents of these applications are hereby incorporated by reference in their entireties.

TECHNICAL FIELD

The present invention relates to float-glass manufacturing apparatuses and float-glass manufacturing methods.

BACKGROUND ART

In a float-glass manufacturing apparatus, a glass ribbon formed in a float bath is conveyed to an annealing furnace via a dross box including lift-out rolls.

The inside of the float bath is filled with a reducing atmosphere because a reducing gas is kept being introduced in order to inhibit the molten metal from oxidizing. Since the atmosphere within the float bath flows into the dross box, the inside of the dross box also is filled with a reducing atmosphere. Meanwhile, the inside of the annealing furnace is filled with an oxidizing atmosphere because outside air flows into the annealing furnace.

Incidentally, such float-glass manufacturing apparatuses have a problem in that the oxidizing atmosphere within the annealing furnace flows into the dross box to cause removing members in contact with the lift-out rolls to be oxidized and burned out. The burning-out of the removing members poses a problem in that it is difficult to remove the foreign matter, e.g., dross, adherent to the surfaces of the lift-out rolls and this results in the occurrence of flaws in the lower surface of the glass ribbon. Patent Document 1 discloses a float-glass manufacturing apparatus including an atmosphere-partitioning device capable of inhibiting an oxidizing atmosphere within the annealing furnace from flowing into the dross box.

CITATION LIST

Patent Literature

Patent Document 1: JP-A-2016-050160

SUMMARY OF INVENTION

Technical Problem

However, in cases when the inflow of an oxidizing atmosphere into the dross box is diminished by reducing a distance between the atmosphere-partitioning device and the glass ribbon as described in, for example, Patent Document 1, this sometimes results in forcible inflow of the reducing atmosphere from the dross box into the annealing furnace. As a result, a stream of a sulfur oxide gas which is being ejected toward the lower surface of the glass ribbon is disturbed to render a buffer film less apt to be formed on the lower surface of the glass ribbon, resulting in the more frequent occurrence of flaws in the lower surface of the glass ribbon.

An object of the present invention, which has been achieved in view of that problem, is to provide float-glass manufacturing apparatuses and float-glass manufacturing methods which enable the formation of a buffer film on the glass ribbon to be attained without being inhibited, while inhibiting the removing members within the dross box from being burned out.

Solution to Problem

In order to solve the above problem, the present invention proposes the following configurations.

A float-glass manufacturing apparatus of the present invention is a float-glass manufacturing apparatus including a float bath to form a glass ribbon on a molten metal and a heat treatment furnace to anneal the glass ribbon, in which the heat treatment furnace includes:
a dross box including a plurality of lift-out rolls to lift the glass ribbon;
an annealing furnace including a plurality of lehr rolls to convey the glass ribbon;
a first partitioning part disposed in a bottom portion of the heat treatment furnace so as to lie between the lift-out roll located most downstream in a conveyance direction of the glass ribbon and the lehr roll located most upstream in the conveyance direction;
a second partitioning part disposed over the first partitioning part, the second partitioning part and the first partitioning part being respectively on both sides of a conveyance route to convey the glass ribbon therethrough;
a gas ejection nozzle which ejects a sulfur oxide gas from under the conveyance route toward the conveyance route; and
a guide member disposed upstream in the conveyance direction from the gas ejection nozzle so as to face any of the plurality of lehr rolls.

Other float-glass manufacturing apparatus of the present invention is a float-glass manufacturing apparatus including a float bath to form a glass ribbon on a molten metal and a heat treatment furnace to anneal the glass ribbon, in which the heat treatment furnace includes:
a dross box including a plurality of lift-out rolls to lift the glass ribbon;
an annealing furnace including a plurality of lehr rolls to convey the glass ribbon;
a first partitioning part disposed in a bottom portion of the heat treatment furnace so as to lie between the lift-out roll located most downstream in a conveyance direction of the glass ribbon and the lehr roll located most upstream in the conveyance direction;
a second partitioning part disposed over the first partitioning part, the second partitioning part and the first partitioning part being respectively on both sides of a conveyance route to convey the glass ribbon therethrough;
a gas ejection nozzle which ejects a sulfur oxide gas from under the conveyance route toward the conveyance route; and
a gas discharge part disposed upstream in the conveyance direction from the gas ejection nozzle.

A float-glass manufacturing method of the present invention is a float-glass manufacturing method including forming a glass ribbon on a molten metal in a float bath and annealing the glass ribbon in a heat treatment furnace, in which,
in the heat treatment furnace, the glass ribbon is lifted in a dross box using a plurality of lift-out rolls and is conveyed in an annealing furnace using a plurality of lehr rolls, a first partitioning part and a second partitioning part are respectively on both sides of a conveyance route to convey the glass ribbon therethrough, in which the first partitioning part is disposed in a bottom portion of the heat treatment furnace so as to lie between the lift-out roll located most downstream in the conveyance direction of the glass ribbon and the lehr roll located most upstream in the conveyance direction, and the second partitioning part is disposed over the first partitioning part, a sulfur oxide gas is ejected by a gas ejection nozzle from under the conveyance route toward the conveyance route, and a guide member is disposed upstream in the conveyance direction from the gas ejection nozzle so as to face any of the plurality of lehr rolls.

Other float-glass manufacturing method of the present invention is a float-glass manufacturing method including forming a glass ribbon on a molten metal in a float bath and annealing the glass ribbon in a heat treatment furnace, in which in the heat treatment furnace, the glass ribbon is lifted in a dross box using a plurality of lift-out rolls and is conveyed in an annealing furnace using a plurality of lehr rolls, a first partitioning part and a second partitioning part are respectively on both sides of a conveyance route to convey the glass ribbon therethrough, in which the first partitioning part is disposed in a bottom portion of the heat treatment furnace so as to lie between the lift-out roll located most downstream in the conveyance direction of the glass ribbon and the lehr roll located most upstream in the conveyance direction, and the second partitioning part is disposed over the first partitioning part, a sulfur oxide gas is ejected by a gas ejection nozzle from under the conveyance route toward the conveyance route, and a gas discharge part is disposed upstream in the conveyance direction from the gas ejection nozzle.

Advantageous Effect of Invention

The float-glass manufacturing apparatuses and the float-glass manufacturing methods of the present invention enable the formation of a buffer film on the glass ribbon to be attained without being inhibited, while inhibiting the removing members within the dross box from being burned out.

DESCRIPTION OF EMBODIMENTS

First Embodiment

A first embodiment of the float-glass manufacturing apparatuses (hereinafter sometimes abbreviated to manufacturing apparatuses) according to the present invention is explained below by reference to FIG. 1 and FIG. 2.

Figure 1:
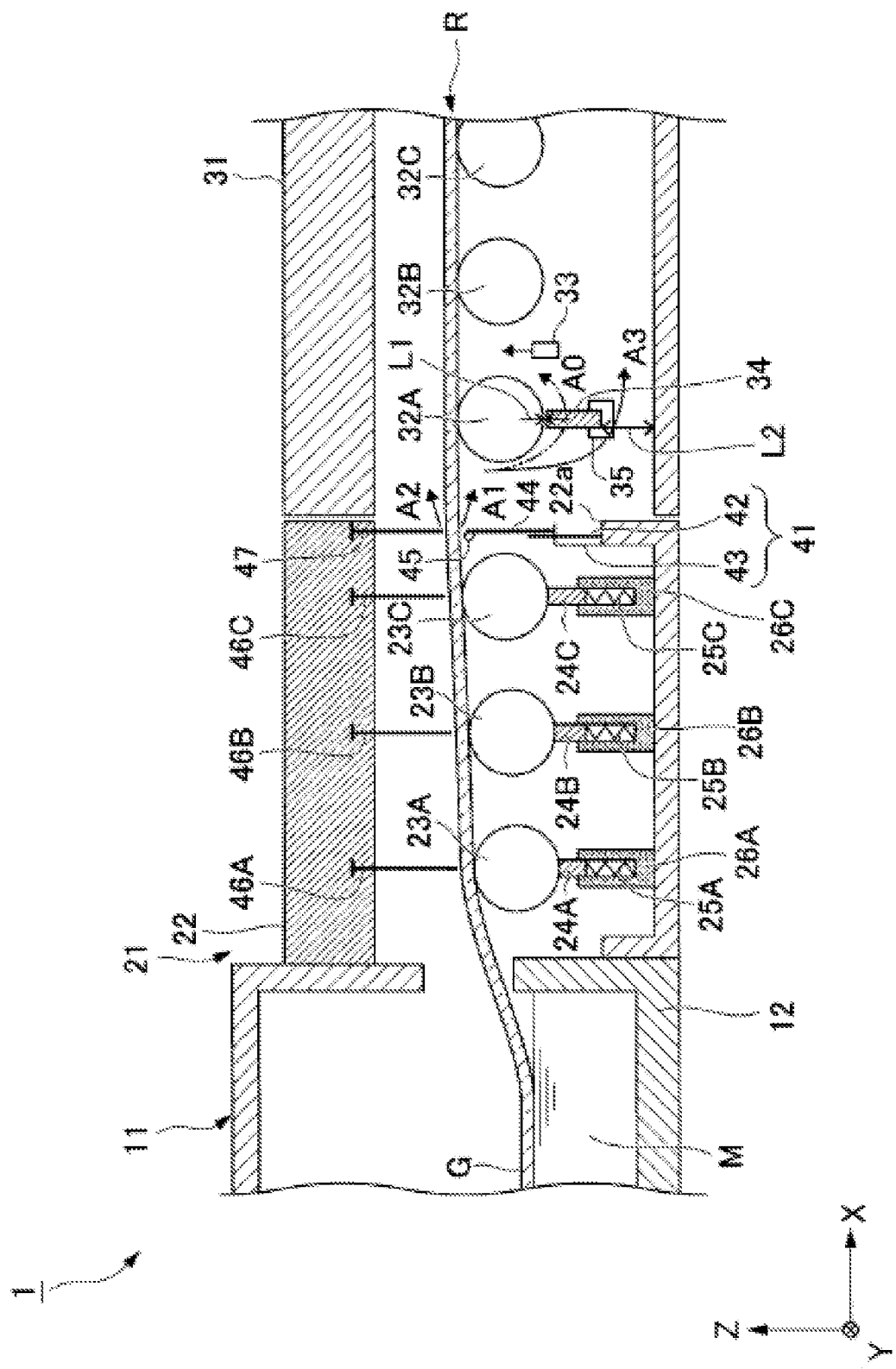
FIG. 1 is a vertically cross-sectional view of a float-glass manufacturing apparatus according to a first embodiment of the present invention.

FIG. 1 is a vertically cross-sectional view of a manufacturing apparatus 1 according to a first embodiment of the present invention.

[Float-Glass Manufacturing Apparatus]

The manufacturing apparatus 1 according to this embodiment includes a float bath 11 and a heat treatment furnace 21. The float bath 11 and the heat treatment furnace 21 are disposed in a row in this order from the upstream side (minus-X side) toward the downstream side (plus-X side) in the conveyance direction (drawing direction) X of a glass ribbon G. In this embodiment, the conveyance direction X is horizontal.

The float bath 11 includes a bathtub 12 to contain a molten metal M. In the float bath 11, a molten glass which is being continuously supplied is formed into a glass ribbon G on the molten metal M. The molten glass is one obtained by melting raw materials for glass in a glass melting furnace (not shown) disposed on the upstream side (minus-X side) of the float bath 11 and refining the melt.

The upper space in the float bath 11 is filled with a reducing gas including nitrogen and hydrogen and has a set pressure higher than the atmospheric pressure. This is for preventing air inflow from the outside and for preventing the molten metal M from oxidizing. The molten metal M is, for example, molten tin or a molten tin alloy.

The heat treatment furnace 21 is for annealing the glass ribbon G, and includes a dross box 22, an annealing furnace 31, a first partitioning part 41, drapes 46A, 46B, and 46C, and a second partitioning part 47. Hereinafter, the drapes 46A, 46B, and 46C are often abbreviated to drapes 46A to 46C; the same applies to the lift-out rolls 23A, 23B, and 23C which will be described later, etc.

The dross box 22 includes lift-out rolls 23A, 23B, and 23C to lift the glass ribbon G, removing members 24A, 24B and 24C which are in contact with the lift-out rolls 23A to 23C, and elastic supports 25A, 25B and 25C which support the removing members 24A to 24C.

In this embodiment, the dross box 22 includes the three lift-out rolls 23A to 23C. The lift-out rolls 23A to 23C are disposed on the downstream side (plus-X side) of the float bath 11. The lift-out rolls 23A to 23C are disposed in a row in the order of lift-out rolls 23A, 23B and 23C from the upstream side (minus-X side) toward the downstream side (plus-X side) along the conveyance direction X so as to be spaced from each other. The lift-out roll 23C is the most downstream lift-out roll in the conveyance direction X among the lift-out rolls 23A to 23C.

There are no limitations on the number of lift-out rolls in the dross box 22. The number thereof may be 2 or may be 4 or larger.

The lift-out rolls 23A to 23C are disposed so that the axial direction Y of the lift-out rolls 23A to 23C is horizontal and is perpendicular to the conveyance direction X. The lift-out rolls 23A to 23C are rotated by a driving device (not shown) such as a motor. The lift-out rolls 23A to 23C, being rotated by the driving force of the driving device, lift the glass ribbon G obliquely upward from the surface of the molten metal M and convey the glass ribbon G in the conveyance direction X toward the annealing furnace 31. A conveyance route R to convey the glass ribbon G therethrough is formed so as to be in contact with upper portions of the lift-out rolls 23A to 23C and of lehr rolls 32A to 32C, which will be described later.

The conveyance route R is an inner portion of the heat treatment furnace 21 through which the glass ribbon G passes. In this embodiment, the conveyance route R, in the dross box 22, at least includes upper portions of the lift-out rolls 23A to 23C and, in the annealing furnace 31, at least includes upper portions of the lehr rolls 32A to 32C, which will be described later.

The removing members 24A to 24C are molded objects of carbon (e.g., graphite) and are formed in the shape of a rectangular parallelepiped. The removing members 24A to 24C are in contact with the lift-out rolls 23A to 23C from under the lift-out rolls 23A to 23C. The removing members 24A to 24C remove tin and tin oxides adherent to the lift-out rolls 23A to 23C.

The elastic supports 25A to 25C push the removing members 24A to 24C upward to keep the removing members 24A to 24C in contact with lower portions of the lift-out rolls 23A to 23C. The elastic supports 25A to 25C are retained in channels 26A, 26B, and 26C. The channels 26A to 26C are fixed to the bottom of the dross box 22.

The drapes 46A to 46C and the second partitioning part 47 are disposed so that the drape 46A, drape 46B, drape 46C, and second partitioning part 47 lie in a row in this order from the upstream side (minus-X side) toward the downstream side (plus-X side) along the conveyance direction X so as to be spaced from each other. The drapes 46A to 46C and the second partitioning part 47 are hung and held by a ceiling wall (external wall) of the dross box 22. Configurations of the drapes 46A to 46C and the second partitioning part 47 are not particularly limited. In this embodiment, these members have the same configuration. The second partitioning part 47 is explained below as an example.

Figure 2:
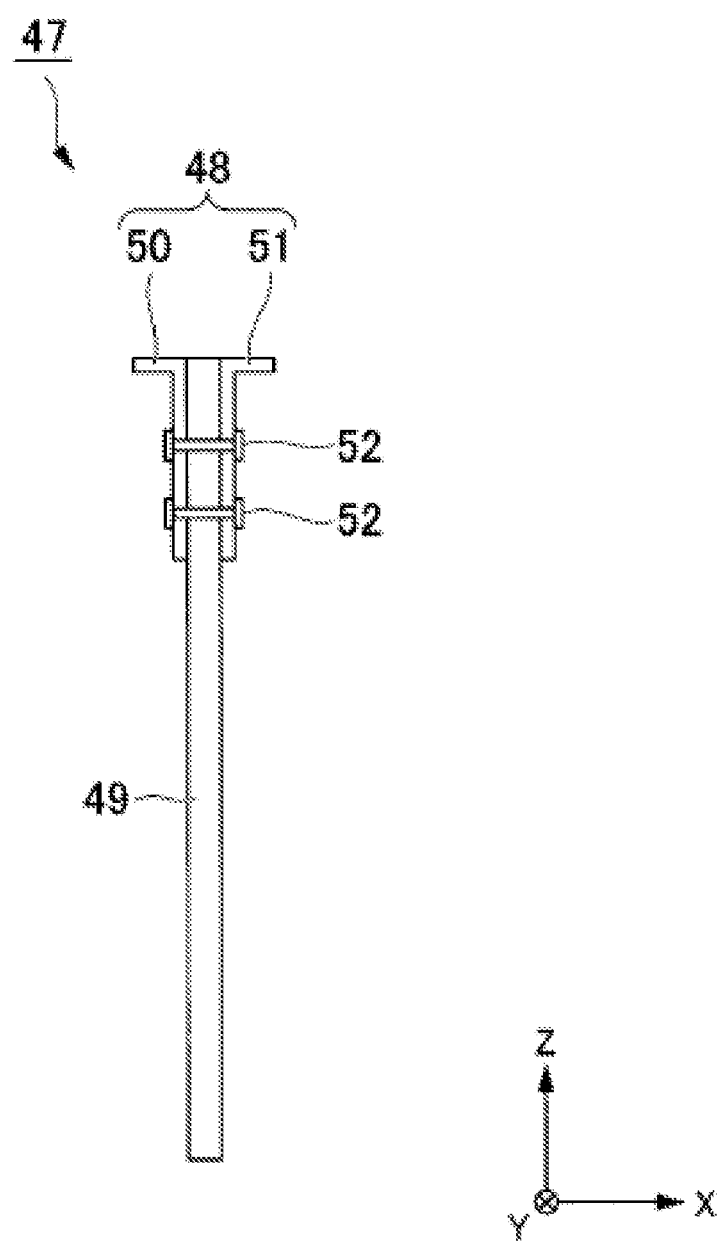
FIG. 2 is a vertically cross-sectional view of a second partitioning part of the float-glass manufacturing apparatus of FIG. 1.

As FIG. 2 shows, the second partitioning part 47 includes a frame part 48 and a plate member 49. The frame part 48 includes a pair of holding parts 50 and 51.

The plate member 49 is a corrugated iron plate made of stainless steel. The plate member 49 is disposed so that the front and back surfaces thereof face the conveyance direction X. The plate member 49 extends in the axial direction Y.

The holding parts 50 and 51 are, for example, angle bars made of stainless steel. The holding parts 50 and 51 extend in the axial direction Y. The holding parts 50 and 51 support an upper end portion of the plate member 49 so that the upper end portion is sandwiched therebetween from both sides. The holding parts 50 and 51 and the plate member 49 are fixed to each other with bolts 52.

The material to form the plate member is not limited to iron plates, and may be a material having heat resistance, e.g., a ceramic. The second partitioning part 47 may be constituted of, for example, a cloth having heat resistance.

As FIG. 1 shows, the drapes 46A to 46C are disposed respectively over the lift-out rolls 23A to 23C. The lower ends of the drapes 46A to 46C do not reach the conveyance route R, and there are gaps in the vertical direction Z between the drapes 46A to 46C and the lift-out rolls 23A to 23C.

The second partitioning part 47 is disposed in a downstream-side (plus-X side) end portion of the dross box 22. This can inhibit the inflow of an oxidizing atmosphere into the dross box 22.

The first partitioning part 41 is disposed in a bottom portion of the dross box 22 and includes a base member 42, a raising/lowering mechanism 43, and a partitioning member 44. The partitioning member 44 is disposed so that the thickness direction thereof is parallel with the conveyance direction X and that the partitioning member 44 faces the conveyance route R. The partitioning member 44, when viewed from the conveyance direction X, has a rectangular shape extending in the axial direction Y. The partitioning member 44 is made of a material having heat resistance, such as a ceramic.

The base member 42 is fixed to a protrudent wall part 22a formed on a downstream-side (plus-X side) end portion of the bottom of the dross box 22. The base member 42 holds the partitioning member 44 so that the partitioning member 44 is movable in the vertical direction Z.

The raising/lowering mechanism 43 includes a motor or the like to move the partitioning member 44 in the vertical direction Z together with the base member 42.

The partitioning member 44 may be made of a metallic material, e.g., stainless steel.

The first partitioning part 41 is disposed between the lift-out roll 23C and the lehr roll 32A, which will be described later.

The first partitioning part 41 is disposed under the second partitioning part 47. Namely, the second partitioning part 47 is disposed over the first partitioning part 41. The second partitioning part 47 and the first partitioning part 41 lie respectively on both sides, along the vertical direction Z, of the conveyance route R. Thus, there is a gap in the vertical direction Z between the first partitioning part 41 and the second partitioning part 47. This gap may be regulated by changing the vertical-direction (Z-direction) position of the lift-out roll 23C or of the lehr roll 32A, which will be described later.

The distance in the conveyance direction X between the first partitioning part 41 and the second partitioning part 47 is preferably ±40 mm or less, more preferably ±30 mm or less, still more preferably ±20 mm or less, based on the first partitioning part 41.

The first partitioning part 41 may not include the raising/lowering mechanism 43.

It is preferable that a gas collection nozzle 45 is disposed at an upper portion of the first partitioning part 41, as shown in FIG. 1. In this example, the gas collection nozzle 45 is fixed to the upstream-side (minus-X side) surface of an upper end portion of the partitioning member 44. In the dross box 22, the gas collection nozzle 45 collects a gas present around the gas collection nozzle 45. The gas collection nozzle 45 is connected to an analyzer (not shown) to analyze the collected gas to detect the oxygen concentration, etc. thereof. The analyzer periodically transmits the results of the analysis to a control unit, which will be described later.

A reducing gas is flowing into the dross box 22 from the float bath 11. The gas collection nozzle 45 mainly collects a reducing atmosphere.

The annealing furnace 31 is for gradually cooling the glass ribbon G to the strain point of the glass or below, and includes lehr rolls 32A, 32B, and 32C, a gas ejection nozzle 33, and a guide member 34. In this embodiment, the annealing furnace 31 includes the three lehr rolls 32A to 32C.

The lehr rolls 32A to 32C are disposed on the downstream side (plus-X side) of the dross box 22. The lehr rolls 32A to 32C are disposed in a row in the order of the lehr rolls 32A, 32B and 32C from the upstream side (minus-X side) toward the downstream side (plus-X side) along the conveyance direction X so as to be spaced from each other. The lehr rolls 32A to 32C convey the glass ribbon G.

The lehr rolls 32A to 32C are disposed so that the axial direction of the lehr rolls 32A to 32C is parallel with the axial direction Y of the lift-out rolls 23A to 23C. The lehr rolls 32A to 32C are rotated by a driving device (not shown) such as a motor.

The lehr roll 32A is located most upstream in the conveyance direction X among the lehr rolls 32A to 32C. Likewise, the lehr roll 32B is located second most upstream in the conveyance direction X among the lehr rolls 32A to 32C.

There are no limitations on the number of lehr rolls in the annealing furnace 31. The number thereof may be 2 or may be 4 or larger.

The gas ejection nozzle 33 ejects a sulfur oxide gas from under the conveyance route R toward the conveyance route R. The term "sulfur oxide gas" herein means sulfur dioxide gas $SO_2$ or sulfur trioxide gas $SO_3$. In this example, the gas ejection nozzle 33 ejects the sulfur oxide gas upward. The position where the gas ejection nozzle 33 is to be disposed is not particularly limited so long as it is under the conveyance route R, and may be, for example, on the upstream side (minus-X side) of the lehr roll 32A or on the downstream side (plus-X side) of the lehr roll 32B. In this embodiment, the gas ejection nozzle 33 is disposed between the lehr roll 32A and the lehr roll 32B. The gas ejection nozzle 33 is connected to a gas supply part (not shown), e.g., a gas cylinder.

There is a space, in the axial direction Y, between the glass ribbon G being conveyed on the lehr rolls 32A to 32C and each side wall of the annealing furnace 31. Hence, the sulfur oxide gas ejected by the gas ejection nozzle 33 moves through the spaces to the lateral sides and upper side of the glass ribbon G.

The gas ejection nozzle 33 may include a configuration to eject air in addition to sulfur dioxide gas $SO_2$ or sulfur trioxide gas $SO_3$.

The guide member 34 is disposed upstream side (minus-X side) in the conveyance direction X of the gas discharge nozzle 33. The guide member 34 is made of a material having heat resistance, e.g., a silica-alumina ceramic. The guide member 34 may be made of a metallic material, e.g., stainless steel.

The guide member 34 is disposed so as to face the lehr roll 32A. In this description, the term "face" is used in a sense which includes contacting. Although the guide member 34 may be in contact with the lehr roll 32A, it is preferable that there is a slight gap between the guide member 34 and the lehr roll 32A.

The guide member 34 is disposed under the lehr roll 32A. The guide member 34 is disposed between the lehr roll 32A and the bottom of the annealing furnace 31.

For example, the guide member 34 is supported from under the guide member 34 by a supporting member 35 disposed on the side walls of the annealing furnace 31. The supporting member 35 is supported by the side walls of the annealing furnace 31. The supporting member 35 may be disposed only in the vicinity of the side walls of the annealing furnace 31 or may be disposed over the entire dimension of the annealing furnace 31 along the axial direction Y.

In the case where the supporting member 35 is disposed over the entire dimension of the annealing furnace 31 along the axial direction Y, the supporting member 35 may be supported by columnar support members disposed between the bottom of the annealing furnace 31 and the supporting member 35.

It is preferable that a lower end portion of the guide member 34 lies below the gas ejection nozzle 33.

A distance L1 between the lehr roll 32A and the guide member 34 is preferably shorter than a distance L2 between the guide member 34 and the bottom of the annealing furnace 31. In the case where the lehr roll 32A is in contact with the guide member 34, the distance between the lehr roll 32A and the guide member 34 is 0.

So long as the guide member lies on the upstream side (minus-X side) of the gas ejection nozzle, the guide member may be disposed so as to face any of the lehr rolls 32A to 32C and may be disposed under any of the lehr rolls 32A to 32C.

A downstream-side (plus-X side) portion of the annealing furnace 31 is open to the outside air and, hence, the inside thereof has an oxidizing atmosphere containing oxygen gas.

In this embodiment, there is a gap, along the conveyance direction X, between the dross box 22 and the annealing furnace 31. The manufacturing apparatus may be configured so that there is no gap between the dross box 22 and the annealing furnace 31.

The control unit includes a control circuit and a memory, which are not shown in the drawing. The control circuit includes a CPU (Central Processing Unit), etc. The memory includes an RAM (Random Access Memory), in which a control program to control the control circuit, threshold values of oxygen concentration, etc are stored.

The control unit is connected to the raising/lowering mechanism 43 of the first partitioning part 41. The control unit controls the raising/lowering mechanism 43.

The control unit may be connected to a raising/lowering mechanism for the drapes 46A to 46C or a raising/lowering mechanism for the second partitioning part 47.

[Float-Glass Manufacturing Method]

Next, a float-glass manufacturing method (hereinafter sometimes abbreviated to manufacturing method) according to this embodiment is explained. This manufacturing method is a method in which a molten glass that is being continuously supplied is formed into a glass ribbon G on a molten metal M in the float bath 11 and the glass ribbon G is annealed in the heat treatment furnace 21. The molten glass is one obtained by melting raw materials for glass in a glass melting furnace (not shown) disposed on the upstream side (minus-X side) of the float bath 11 and refining the melt.

First, in a lifting step, a glass ribbon G is lifted using the lift-out rolls 23A to 23C in the dross box 22, which adjoins the float bath 11. In the lifting step, a conveyance route R through which the glass ribbon G is to be conveyed extends through the gap between the first partitioning part 41 and the second partitioning part 47 which lie respectively on both sides of the conveyance route R in the vertical direction Z. Hence, the inside of the dross box 22 is kept having a positive pressure with a reducing atmosphere, thereby inhibiting the removing members 24A to 24C from being oxidized and burned out.

Some of the reducing atmosphere in the dross box 22 forcibly flows into the annealing furnace 31 through the space between the first partitioning part 41 and the glass ribbon G as shown by arrow A1 in FIG. 1 and forcibly flows into the annealing furnace 31 through the space between the second partitioning part 47 and the glass ribbon G as shown by arrow A2.

Since the reducing atmosphere which flows into the annealing furnace 31 has a higher temperature than the oxidizing atmosphere present in the annealing furnace 31, the reducing atmosphere tends to move upward.

Next, in a conveyance step, the glass ribbon G is conveyed using the lehr rolls 32A to 32C in the annealing furnace 31, which adjoins the dross box 22. In the conveyance step, a sulfur oxide gas is ejected by the gas ejection nozzle 33 in the annealing furnace 31 from under the conveyance route R toward the conveyance route R. The sulfur oxide gas reacts with an alkali metal or alkaline-earth metal present in the glass to thereby form a buffer film on the glass ribbon G.

For example, in a conventional manufacturing apparatus which does not include the guide member 34, the reducing atmosphere moves to under the lehr roll 32A, ascends, and flows near the gas ejection nozzle 33, as shown by arrow A0 in FIG. 1.

In contrast, in the manufacturing method according to this embodiment, the guide member 34 is disposed so as to face the lehr roll 32A on the upstream side (minus-X side) of the gas ejection nozzle 33. Because of this, the reducing atmosphere which flows through the space between the first partitioning part 41 and the glass ribbon G as shown by arrow A1 flows under the lehr roll 32A and the guide member 34 as shown by arrow A3 and is less apt to interfere with the sulfur oxide gas ejected by the gas ejection nozzle 33.

During the lifting step and the conveyance step, the analyzer analyzes a gas collected by the gas collection nozzle 45 to detect the oxygen concentration, etc. thereof and periodically transmits the results of the analysis to the control unit.

On the basis of the results of the detection with the gas collection nozzle 45, the control unit operates the raising/lowering mechanism 43 of the first partitioning part 41 to regulate the distance from the conveyance route R to the partitioning member 44 of the first partitioning part 41. For example, in cases when the detected oxygen concentration is higher than a threshold value of oxygen concentration stored in the memory, the control unit raises the partitioning member 44 to reduce the distance from the conveyance route R to the partitioning member 44 of the first partitioning part 41. Meanwhile, in cases when the detected oxygen concentration is lower than the threshold value of oxygen concentration, the control unit lowers the partitioning member 44 to increase the distance from the conveyance route R to the partitioning member 44 of the first partitioning part 41.

When the conveyance step is carried out to complete the annealing of the glass ribbon G in the annealing furnace 31, a sheet glass is produced. The lifting step and the conveyance step are consecutively performed and the sheet glass is continuously produced. The sheet glass after being annealed is cut into desired sizes with a cutter (not shown).

As explained above, the manufacturing apparatus 1 and manufacturing method according to this embodiment are capable of inhibiting the removing members 24A to 24C in the dross box 22 from being burned out, since the manufacturing apparatus includes the first partitioning part 41 and the second partitioning part 47 and the inside of the dross box 22 can hence be kept having a positive pressure with a reducing atmosphere.

Since the guide member 34 is disposed so as to face the lehr roll 32A, the reducing atmosphere which flows into the annealing furnace 31 flows along the upstream-side (minus-X side) surfaces of the lehr rolls 32A and guide member 34 and is less apt to interfere with the sulfur oxide gas ejected by the gas ejection nozzle 33. Consequently, the formation of a buffer film on the glass ribbon G can be attained without being inhibited.

The guide member 34 is disposed under the lehr roll 32A. This can make the reducing atmosphere less apt to flow beneath the lehr roll 32A. In addition, since the distance between the first partitioning part 41 and the lehr roll 32A can be shorter than in the case where the guide member is disposed so as to extend obliquely downward toward the upstream side (minus-X side), the annealing furnace 31 containing the lehr roll 32A and the guide member 34 can be shortened in the conveyance direction X.

Since the lower end portion of the guide member 34 lies below the gas ejection nozzle 33, the reducing atmosphere is apt to pass under the gas ejection nozzle 33 and can be made to flow so as to be still less apt to interfere with the sulfur oxide gas ejected by the gas ejection nozzle 33.

The distance L1 between the lehr roll 32A and the guide member 34 is shorter than the distance L2 between the guide member 34 and the bottom of the annealing furnace 31. Due to this, the reducing atmosphere is less apt to flow through the space between the lehr roll 32A and the guide member 34 and is apt to flow through the space between the guide member 34 and the bottom of the annealing furnace 31. Thus, the reducing atmosphere can be led so as to flow through the space between the guide member 34 and the bottom of the annealing furnace 31 rather than to flow through the space between the lehr roll 32A and the guide member 34.

Since the manufacturing apparatus 1 includes the gas collection nozzle 45, it is possible to collect a gas present around the gas collection nozzle 45 and analyze the gas with, for example, the analyzer.

In the manufacturing method, the distance from the conveyance route R to the first partitioning part 41 is regulated on the basis of the results of the detection with the gas collection nozzle 45. It is hence possible to regulate the distance from the conveyance route R to the first partitioning part 41 in view of the oxygen concentration, etc. of the gas collected by the gas collection nozzle 45.

The guide member 34 may be disposed on the upstream side (minus-X side) of the lehr roll 32A.

The second partitioning part may be made to have a configuration such as that of the first partitioning part 41, and the distance from the conveyance route R to the second partitioning part may be regulated on the basis of the results of detection with the gas collection nozzle 45.

Second Embodiment

Next, a second embodiment of the present invention is explained by reference to FIG. 3 to FIG. 6. The same portions or parts as in the embodiment described above are designated by the same numerals or signs, and explanations thereon are omitted. Different respects only are explained below.

[Float-Glass Manufacturing Apparatus]

Figure 3:
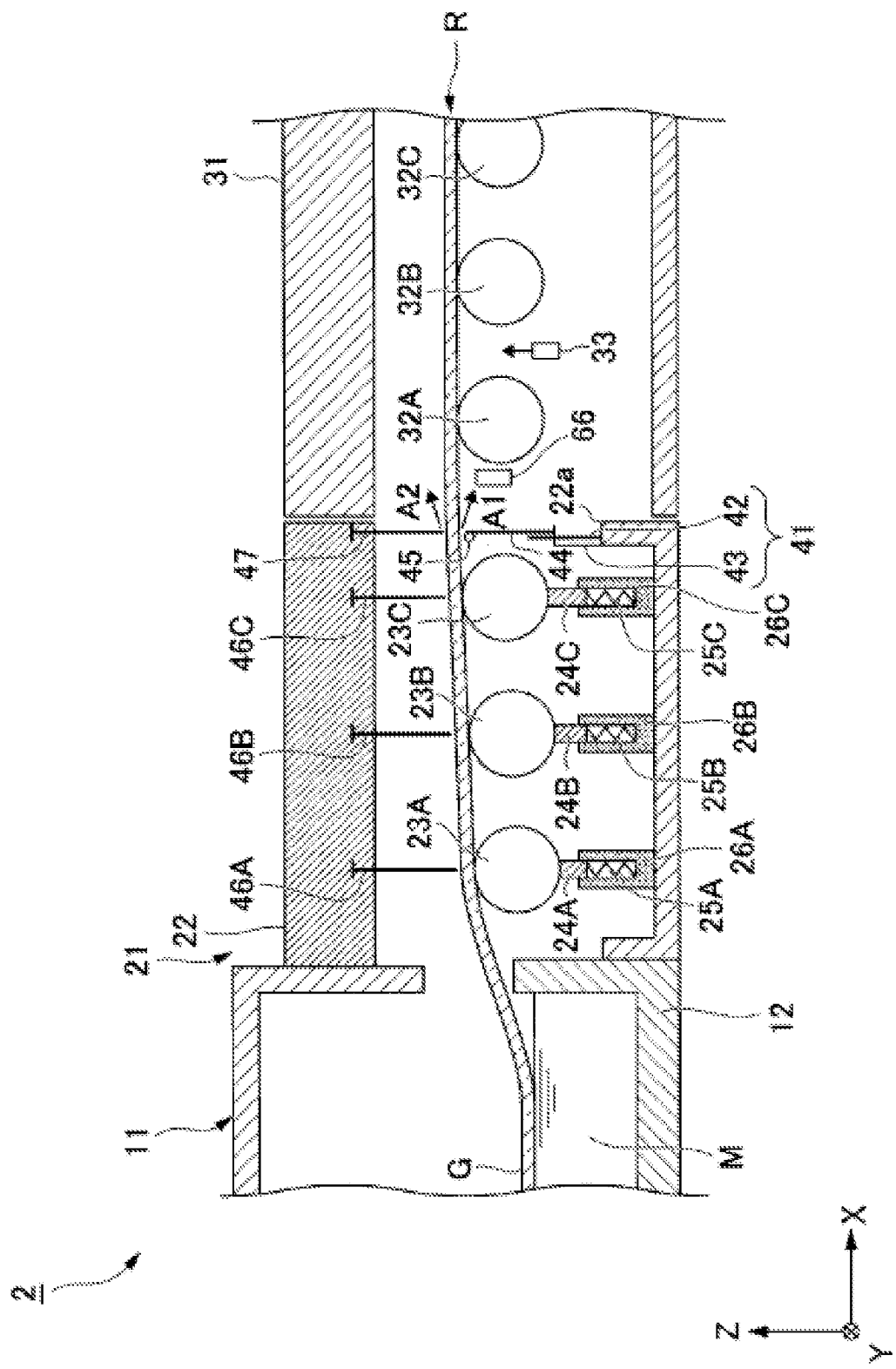
FIG. 3 is a vertically cross-sectional view of a float-glass manufacturing apparatus according to a second embodiment of the present invention.

As FIG. 3 shows, a manufacturing apparatus 2 according to this embodiment includes a gas discharge part 66 in place of the guide member 34 employed in the manufacturing apparatus 1 according to the first embodiment.

In the annealing furnace 31, the gas discharge part 66 is disposed upstream side (minus-X side) in the conveyance direction X of the gas ejection nozzle 33. The gas discharge part 66 is disposed between the first partitioning part 41 and the lehr roll 32A and under the conveyance route R.

Figure 4:
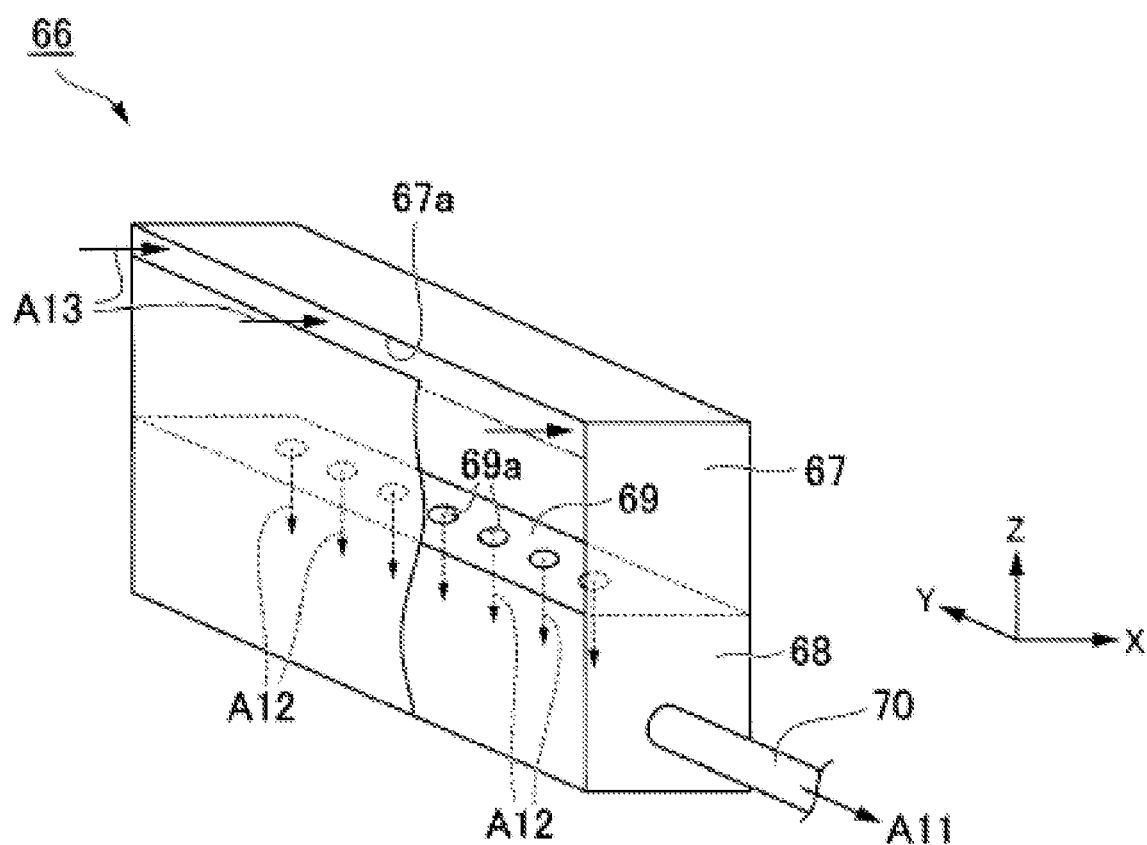
FIG. 4 is a partially cutaway slant view of a gas discharge part of the float-glass manufacturing apparatus of FIG. 3.

As FIG. 4 shows, the gas discharge part 66 includes a slit box 67 and a perforated box 68. The slit box 67 and the perforated box 68 each have an outer shape which is a rectangular parallelepiped box. The slit box 67 and the perforated box 68 each extend in the axial direction Y. The gas discharge part 66 may be disposed over the entire width of the annealing furnace 31 along the axial direction Y.

The slit box 67 has a slit 67a formed in an upper end portion of the wall thereof facing the upstream side (minus-X side). The slit 67a extends in the axial direction Y and is formed over the entire length of the slit box 67 along the axial direction Y.

The perforated box 68 is disposed beneath the slit box 67. An upper wall portion of the perforated box 68 is integrated with a lower wall portion of the slit box 67 to constitute a separation wall part 69. The separation wall part 69 is disposed so that the thickness direction thereof is parallel with the vertical direction Z. In the separation wall part 69, a plurality of perforations 69a piercing in the vertical direction Z are formed. The plurality of perforations 69a are disposed so as to be spaced from each other in the axial direction Y.

A first end portion of a pipeline 70 is connected to a surface of the perforated box 68 which faces the axial direction Y. The pipeline 70 pierces a side wall of the annealing furnace 31 in the axial direction Y. A second end portion of the pipeline 70 is connected to an exhaust device (not shown) such as a gas pump.

Upon operation of the exhaust device, the discharge gas within the pipeline 70, which includes a reducing atmosphere, etc., is sucked toward the exhaust device as shown by arrow A11 and discharged from the annealing furnace 31. As the gas within the pipeline 70 is thus sucked, a discharge gas flows, as arrows A12 show, from the slit box 67 toward the perforated box 68 through the plurality of perforations 69a. Since a pressure loss due to the plurality of perforations 69a is dominant in the gas discharge part 66, a flow rate of the discharge gas which is flowing in the gas discharge part 66 is substantially even in the axial direction Y. Because of this, the flow rate of the discharge gas which is sucked through the slit 67a of the slit box 67 as shown by arrows A13 is substantially even in the axial direction Y.

Thus, the discharge gas which is sucked through the slit 67a of the gas discharge part 66 substantially evenly in the axial direction Y is discharged from the annealing furnace 31 through the pipeline 70 and the exhaust device.

So long as the gas discharge part lies on the upstream side (minus-X side) of the gas ejection nozzle, the gas discharge part may be disposed between the lehr roll 32A and the lehr roll 32B or between the lehr roll 32B and the lehr roll 32C.

The outer shape of the gas discharge part is not limited to the shape of a rectangular parallelepiped box, and may be, for example, cylindrical. In this case, use is made of a double-pipe cylindrical gas discharge part, in which an outer pipe has a slit and an inner pipe has a plurality of perforations. It is preferable that the slit is formed in a position which forms an angle of −30 to −60 degrees with the vertical direction, in a vertically cross-sectional view. This is because if the slit is formed in a position which forms an angle of 0 degree with the vertical direction, there is a possibility that the sulfur oxide gas present on the downstream side (plus-X side) of the gas discharge part might be sucked to corrode the pipeline of the gas discharge part. It is also preferable that the gas discharge part includes a mechanism whereby the position of the slit can be changed in the direction of rotation.

[Float-Glass Manufacturing Method]

Next, a manufacturing method according to this embodiment is explained.

First, the lifting step described above is conducted.

Consecutively, a conveyance step is conducted. In the conveyance step, the gas discharge part 66 is disposed upstream side (minus-X side) in the conveyance direction X of the gas ejection nozzle 33. In this case, the reducing atmosphere which flows into the annealing furnace 31 through the space between the first partitioning part 41 and the glass ribbon G as shown by arrow A1 in FIG. 3 is discharged to the outside of the annealing furnace 31 through the gas discharge part 66. Some of the reducing atmosphere which flows into the annealing furnace 31 through the space between the second partitioning part 47 and the glass ribbon G as shown by arrow A2 is also sucked by the gas discharge part 66 through the space formed between the glass ribbon G and each side wall of the annealing furnace 31.

As explained above, in the manufacturing apparatus 2 and manufacturing method according to this embodiment, a reducing atmosphere which flows from the dross box 22 into the annealing furnace 31 is discharged by the gas discharge part 66. Because of this, the reducing atmosphere can be inhibited from interfering with the gas ejection nozzle 33 and the formation of a buffer film on the glass ribbon G can be attained without being inhibited, while inhibiting the removing members 24A to 24C in the dross box 22 from being burned out.

Furthermore, since the gas discharge part 66 is disposed under the conveyance route R, a reducing atmosphere which flows into the annealing furnace 31 through the space between the first partitioning part 41 and the glass ribbon G flows near the gas discharge part 66. Hence, the reducing atmosphere can be efficiently discharged by the gas discharge part 66.

So long as the gas discharge part lies upstream side (minus-X side) in the conveyance direction X of the gas discharge nozzle 33, the gas discharge part may be disposed over the conveyance route R or may be disposed in the space between the glass ribbon G and a side wall of the annealing furnace 31 at the same position as the conveyance route R along the vertical direction Z.

Figure 5:
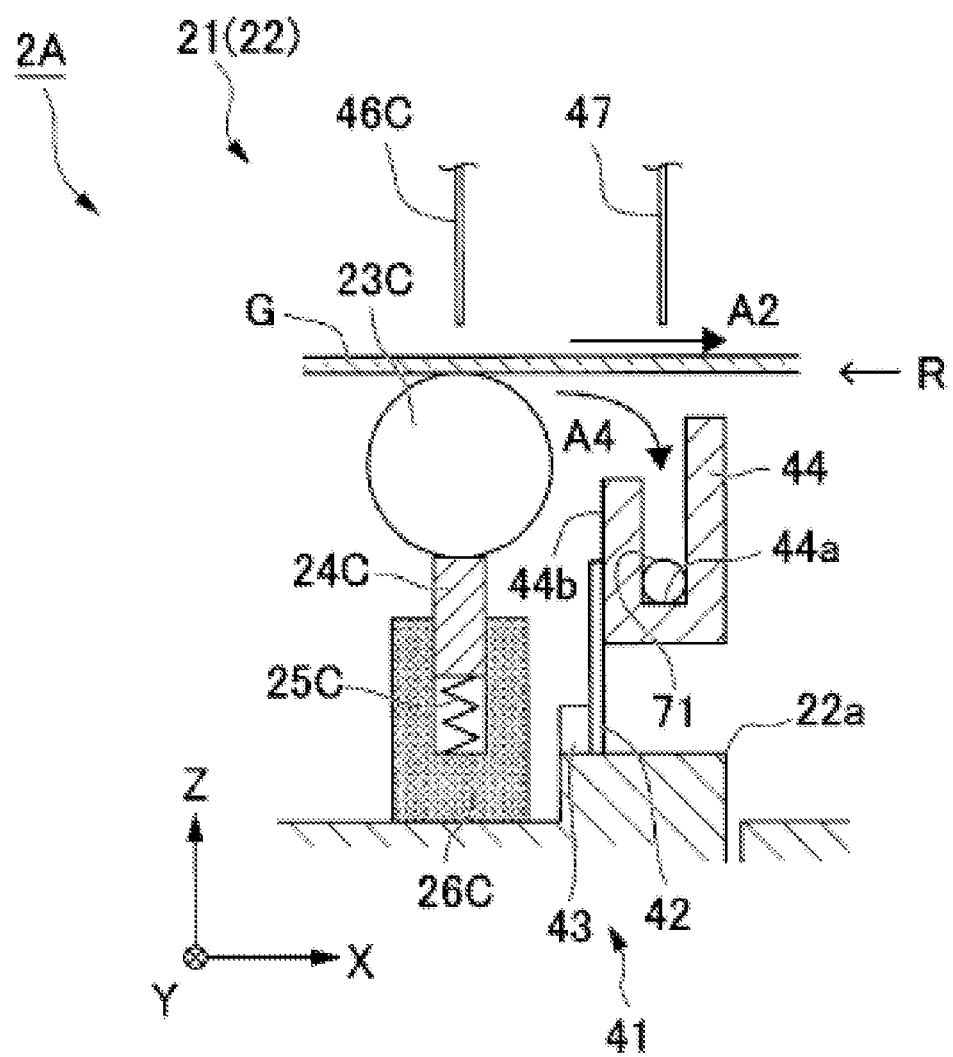
FIG. 5 is a vertically cross-sectional view of a main portion of a float-glass manufacturing apparatus according to modification example 1 of the second embodiment of the present invention.

Moreover, as in the manufacturing apparatus 2A shown in FIG. 5, a groove 44a may be formed in the upper surface of the partitioning member 44 of the first partitioning part 41 to dispose a gas discharge part 71 on the bottom of the groove 44a. In this example, a reducing atmosphere which flows through the space between the first partitioning part 41 and the glass ribbon G is sucked by the gas discharge part 71 through the groove 44a of the partitioning member 44 as shown by arrow A4. Thus, the position of the gas discharge part 71 is only required to be disposed downstream side (plus-X side) in the conveyance direction X of the surface 44b of the partitioning member 44 which lies on the upstream side (minus-X side) in the conveyance direction X.

Figure 6:
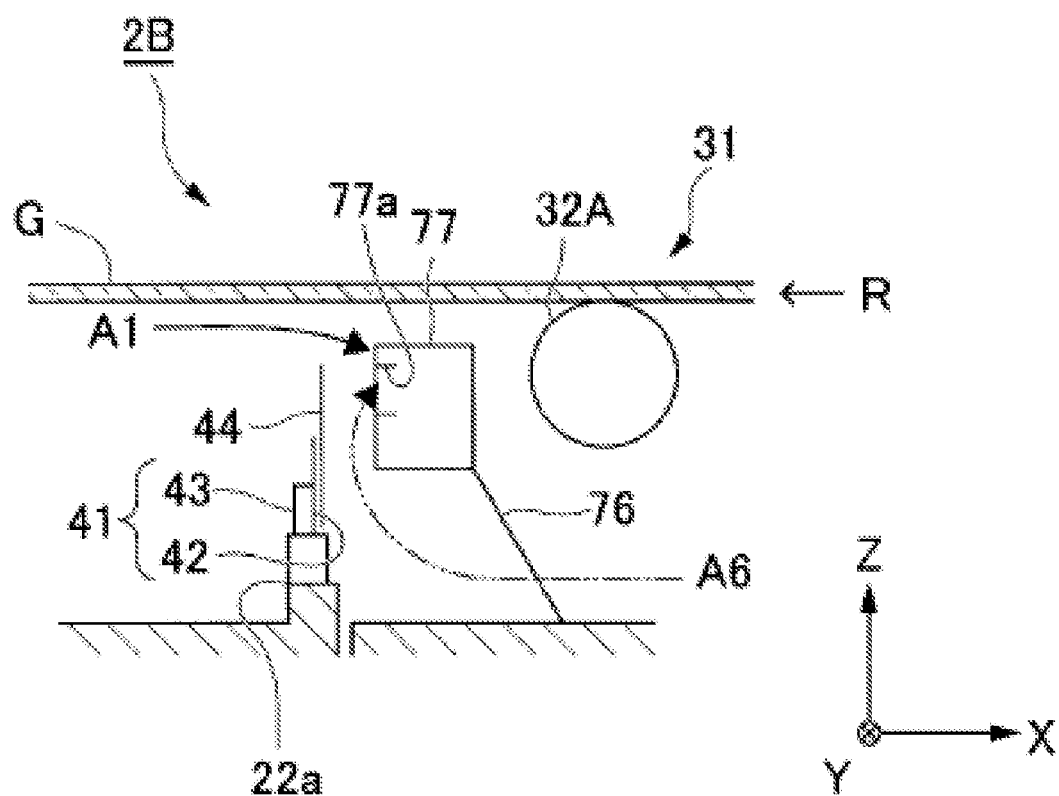
FIG. 6 is a vertically cross-sectional view of a main portion of a float-glass manufacturing apparatus according to modification example 2 of the second embodiment of the present invention.

As in the manufacturing apparatus 2B shown in FIG. 6, the heat treatment furnace may include a shielding plate 76 to partition the space between a bottom portion of the annealing furnace 31 and a gas discharge part 77. In this modification example, the gas discharge part 77 has the shape of a box. The gas discharge part 77 has an opening 77*a* formed in an end portion of the gas discharge part 77 which lies on the upstream side (minus-X side) in the conveyance direction X, the opening 77*a* facing the upstream side (minus-X side). For example, the shielding plate 76 is connected to a bottom portion of the gas discharge part 77 and has such a gradient that the shielding plate 76 deflects gradually to the downstream side (plus-X side) toward the bottom.

This configuration inhibits an oxidizing atmosphere from flowing from the downstream side (plus-X side) to the upstream side (minus-X side) in the annealing furnace 31 and being sucked into the opening 77*a* of the gas discharge part 77 as shown by arrow A6. The configuration enables the reducing atmosphere which flows into the annealing furnace 31 through the space between the first partitioning part 41 and the glass ribbon G to be more reliably discharged through the opening 77*a* of the gas discharge part 77.

The opening 77*a* of the gas discharge part 77 may be disposed in an upper portion of the gas discharge part 77. The shielding plate 76 may not have the gradient.

Third Embodiment

Next, a third embodiment of the present invention is explained by reference to FIG. 7. Here, only configurations different from those in the embodiments described above are explained.

[Float-Glass Manufacturing Apparatus]

Figure 7:
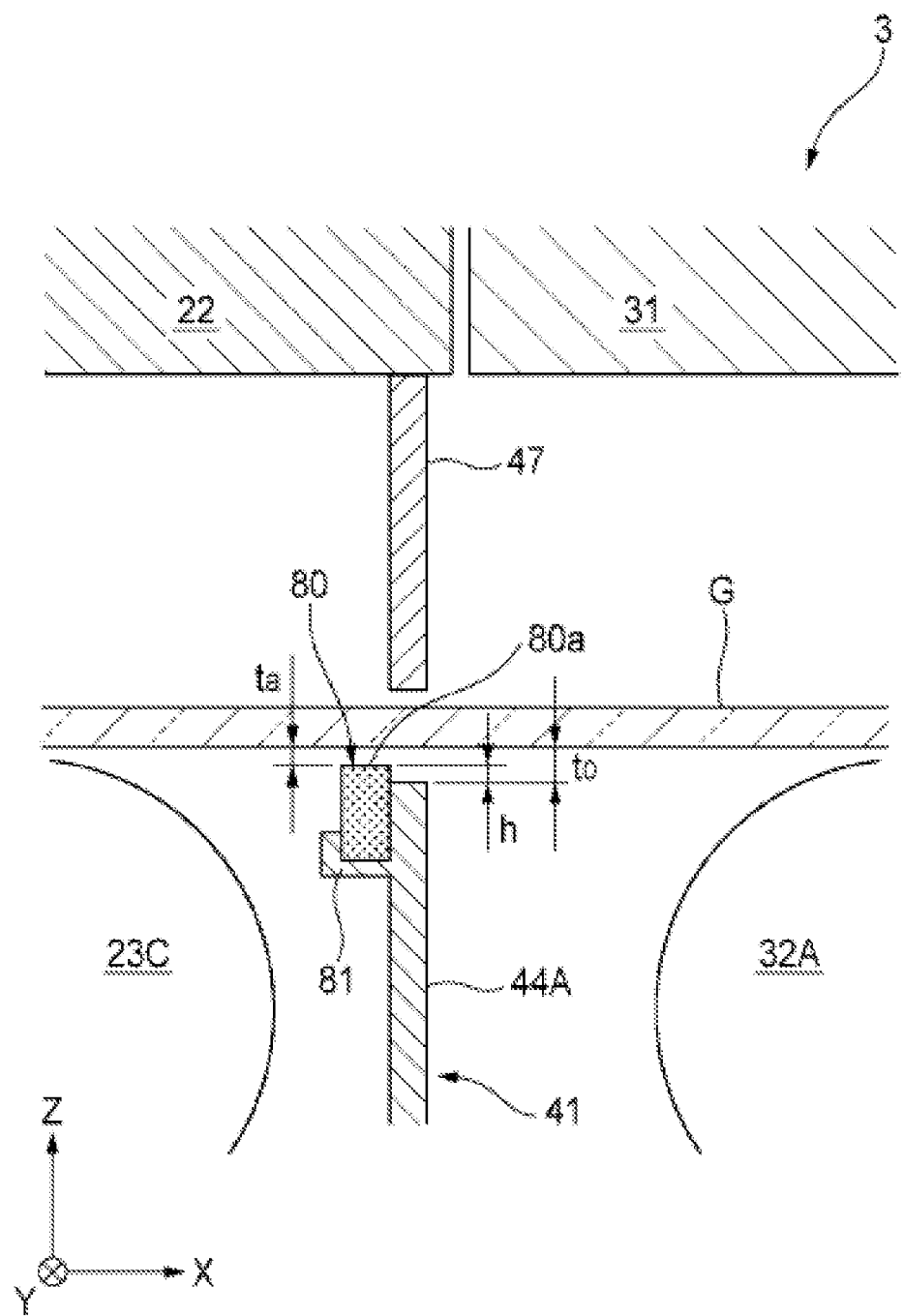
FIG. 7 is a vertically cross-sectional view of a main portion of a float-glass manufacturing apparatus according to a third embodiment of the present invention.

As FIG. 7 shows, a manufacturing apparatus 3 according to this embodiment has the same configurations as the manufacturing apparatus 1 according to the first embodiment and the manufacturing apparatus 2 according to the second embodiment, except that this manufacturing apparatus 3 differs in the configuration of the partitioning member 44 of the first partitioning part 41 (see FIG. 1 or FIG. 3) employed in the manufacturing apparatus 1 according to the first embodiment or the manufacturing apparatus 2 according to the second embodiment.

The third embodiment employs a partitioning member 44A, and a heat-resistant fibrous sheet 80 is fixed to an upstream-side (minus-X side) portion, along the conveyance direction X, of an upper portion thereof which is close to the lower surface of the glass ribbon G. The heat-resistant fibrous sheet 80 is longer than the width of the glass ribbon G along the axial direction Y (the width perpendicular to the conveyance direction), and is a rectangular sheet in a side view in which the sheet 80 is viewed from the conveyance direction X of FIG. 7. However, the shape of the heat-resistant fibrous sheet 80 is not limited to that.

The heat-resistant fibrous sheet 80 is supported by a sheet-supporting part 81 disposed on an upstream-side (minus-X side) surface of the partitioning member 44A. The heat-resistant fibrous sheet 80 is disposed at least over the entire width of the glass ribbon G along the axial direction Y so as to face the lower surface of the glass ribbon G. At least a part of the heat-resistant fibrous sheet 80 is fixed according to need to the sheet-supporting part 81 using bolts, etc. Thus, the heat-resistant fibrous sheet 80 is raised/lowered, in the state of being integrated with the partitioning member 44A, by the operation of raising/lowering the partitioning member 44A by the raising/lowering mechanism 43 (see FIG. 1). The mode of fixing the heat-resistant fibrous sheet 80 is not limited to that by the sheet-supporting part 81 described above, and any desired mode of fixing can be employed.

It is preferable that an upper end 80*a* of the heat-resistant fibrous sheet 80 fixed to the sheet-supporting part 81 protrudes above the upper end of the partitioning member 44A of the first partitioning part 41. In this case, the heat-resistant fibrous sheet 80 is disposed so that the upper end 80*a* thereof is closer to the lower surface of the glass ribbon G than the upper end of the partitioning member 44A. Thus, the gap through which the dross box 22 communicates with the annealing furnace 31 is narrowed by the heat-resistant fibrous sheet 80. Namely, the gap underlying the glass ribbon G is reduced from the gap to between the upper end of the partitioning part 44A and the lower surface of the glass ribbon G to the gap ta between the upper end 80*a* of the heat-resistant fibrous sheet 80 and the lower surface of the glass ribbon G.

The gap ta is set in accordance with production conditions for the glass ribbon G, etc. The heat-resistant fibrous sheet 80 may come into contact with the glass ribbon G. In this case, any foreign matter remaining on the lower surface of the glass ribbon G can be removed by the heat-resistant fibrous sheet 80.

The protrusion height h of the heat-resistant fibrous sheet 80, which is the height of the upper end 80*a* of the heat-resistant fibrous sheet 80 from the upper end of the partitioning member 44A, is preferably in the range of 5 mm±2 mm. The protrusion of the heat-resistant fibrous sheet 80 from the upper end of the partitioning member 44A can inhibit the partitioning member 44A from coming into contact with the glass ribbon G when raised.

It is preferable that the heat-resistant fibrous sheet 80 includes fibers of a material which can withstand temperatures of 750° C. or higher, in particular, 1,000° C. or higher. Examples thereof include inorganic fibers such as carbon fibers, silica fibers, alumina fibers, silicon carbide fibers, and metal fibers. Especially preferred are carbon fibers, which have a low hardness and are less apt to give scratches to the glass ribbon G and which repel molten tin. The fibrous sheet is preferably a felt sheet or a woven or nonwoven fibrous sheet. Specifically, use can be made, for example, of a felt sheet of carbon fibers (carbon felt) or a woven fabric of carbon fibers (carbon cloth). The heat-resistant fibrous sheet 80 may be a fibrous sheet including inorganic fibers of two or more kinds differing in material. Even if carbon fibers remain on the lower surface of the glass ribbon G, the carbon fibers are burned out in an oxidizing atmosphere having a relatively high temperature, for example, in a downstream-side (plus-X side) in the annealing furnace 31, resulting in no defects such as soils.

The thickness of the heat-resistant fibrous sheet 80 is not particularly limited. However, the thickness thereof is preferably 5 mm or larger from the standpoint of making the sheet 80 flexible. Although there is no particular upper limit on the thickness thereof, the thickness thereof is preferably 30 mm or less, more preferably 10-20 mm, from the standpoint of pressure loss for the reducing gas. In forming the heat-resistant fibrous sheet, a felt sheet only may be used, or a plurality of woven fabrics or nonwoven fabrics may be stacked, or a felt sheet may be combined with the woven fabric or the nonwoven fabric.

[Float-Glass Manufacturing Method]

Next, a manufacturing method according to this embodiment is explained.

After the lifting step described above, a conveyance step is conducted.

In the conveyance step, the flow of a reducing atmosphere to the downstream side (plus-X side) in the conveyance direction X is reduced by the heat-resistant fibrous sheet 80 provided to an upper portion of the partitioning member 44A of the first partitioning part 41.

Due to this first partitioning part 41, the gap underlying the glass ribbon G is narrowed by the heat-resistant fibrous sheet 80 to make the reducing atmosphere within the dross box 22 less apt to flow into the annealing furnace 31. Since the heat-resistant fibrous sheet 80 may come into contact with the glass ribbon G, it is easy, in raising the partitioning member 44A, to dispose the heat-resistant fibrous sheet 80 at a position closer to the glass ribbon G. The gap to can hence be set at a smaller value. Thus, by disposing the heat-resistant fibrous sheet 80 at the upper portion of the partitioning member 44A to narrow the gap underlying the glass ribbon G, the reducing atmosphere can be inhibited from adversely affecting the formation of a buffer film on the glass ribbon G in the annealing furnace 31.

A modification example of the third embodiment of the present invention is explained next.

Figure 8:
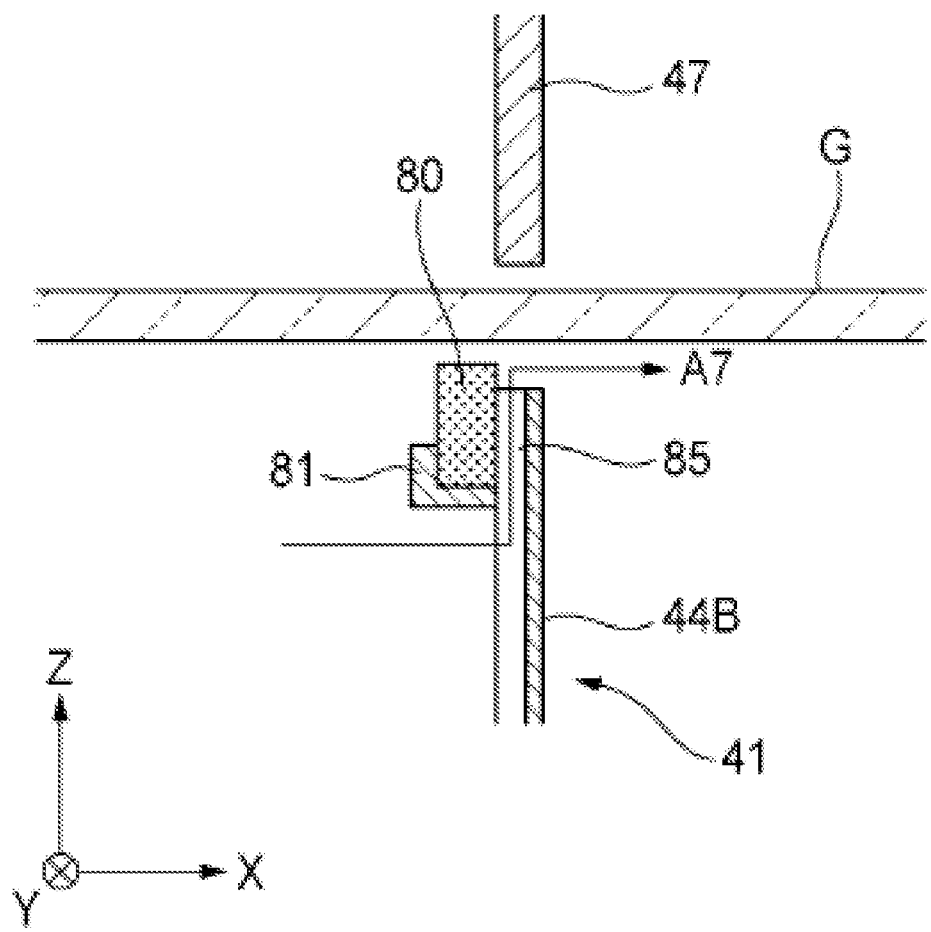
FIG. 8 is a vertically cross-sectional view of a main portion of a float-glass manufacturing apparatus according to a modification example of the third embodiment.
Figure 9:
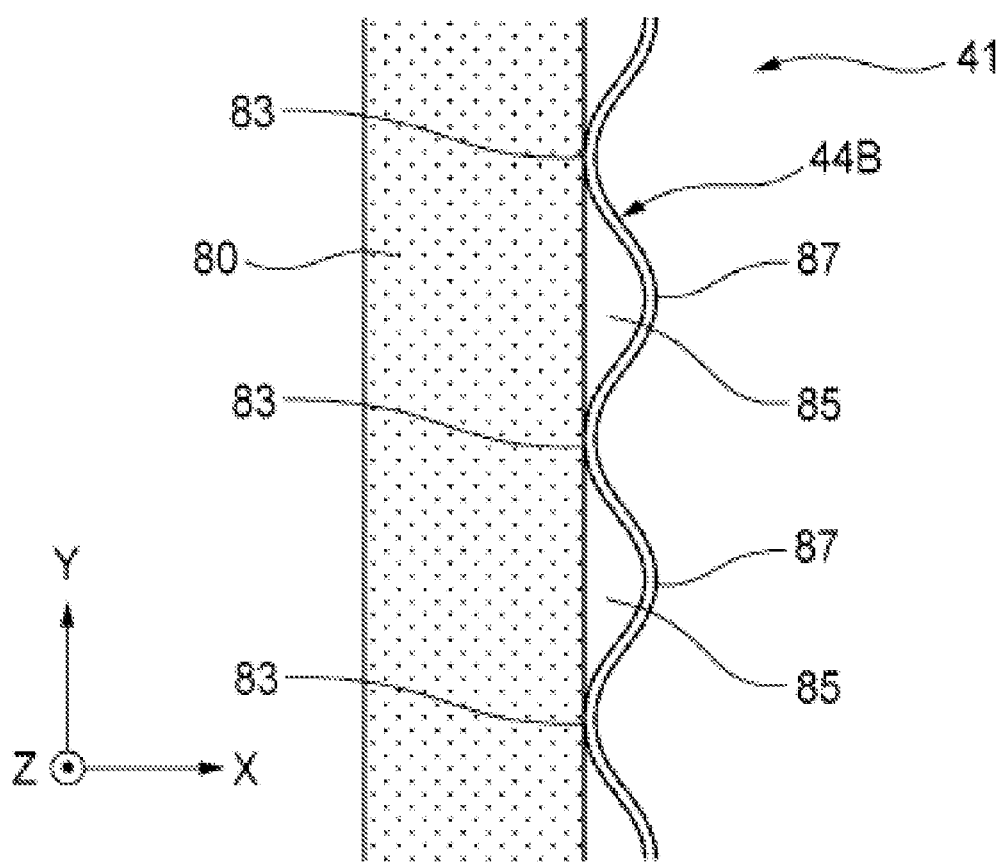
FIG. 9 is a partially enlarged plan view of the partitioning member and heat-resistant fibrous sheet shown in FIG. 8, viewed from above.

FIG. 8 is a vertically cross-sectional view of a main portion of a float-glass manufacturing apparatus according to the modification example. FIG. 9 is a partially enlarged plan view of the partitioning member 44B and heat-resistant fibrous sheet 80 shown in FIG. 8, viewed from above.

As FIG. 9 shows, the partitioning member 44B in this modification example is a platy material which is continuously corrugated along the Y direction. The heat-resistant fibrous sheet 80 is fixed to the sheet-supporting part 81 shown in FIG. 8 so as to be in contact with ridges 83 of the corrugation of the partitioning member 44B.

Between the upstream-side (minus-X side) surface of the partitioning member 44B and the heat-resistant fibrous sheet 80, gaps 85 are formed due to the corrugation. Namely, a gap 85 which is continuous along the Z direction is formed between a pair of upstream-side (minus-X side) adjacent ridges 83 of the partitioning member 44B and the downstream-side (plus-X side) ridge 87 located between those two ridges 83. A plurality of such gaps 85 are formed in a row along the Y direction.

According to this configuration, a reducing atmosphere flows toward the downstream side (plus-X side) in the conveyance direction X through the gaps 85 as shown by arrow A7 in FIG. 8. In this configuration, the flow of the reducing atmosphere toward the downstream side (plus-X side) in the conveyance direction X, which occurs on the lower-surface side of the glass ribbon G, can be reduced to maintain an internal pressure of the dross box, by properly setting the size (cross-sectional area) of the gaps 85. Furthermore, the flow of an oxidizing atmosphere which moves toward the upstream side (minus-X side) in the conveyance direction X through the spaces beside one and the other edges of the glass ribbon G along the axial direction Y can be minimized (for example, the oxygen concentration in a region of the dross box is less than 100 ppm).

Besides being formed by the corrugated partitioning member 44B, gaps 85 may be formed by an appropriate mechanism, for example, by disposing a fixing mechanism whereby the heat-resistant fibrous sheet 80 is fixed to the sheet-supporting member 81 so as to be separated from the partitioning member toward the upstream side (minus-X side).

Although the first embodiment, second embodiment, and third embodiment of the present invention were described above in detail by reference to the drawings, the specific configurations are not limited to those of the embodiments. Modifications, combinations, elimination, etc. of the configurations within the scope of the present invention are included in the invention. It is a matter of course that two or more of the configurations shown in the embodiments can be suitably combined and utilized.

For example, the manufacturing apparatus 1 according to the first embodiment may include the gas discharge part 66, and the manufacturing apparatus 2 according to the second embodiment may include the guide member 34. Furthermore, a configuration obtained by suitably combining the first embodiment with the second embodiment may be combined with a configuration of the third embodiment.

Moreover, a heat-resistant fibrous sheet may be provided to a lower portion of the second partitioning part 47 or of any of the drapes 46A to 46C so as to face the upper surface of the glass ribbon G. Thus, the gap overlying the glass ribbon G can be narrowed.

The lehr roll 32A may be disposed under the conveyance route R without being in contact with the glass ribbon G. The raising/lowering mechanism 43 of the first partitioning part 41 may be manually operated.

The manufacturing apparatus may include monitoring cameras for regulating the level (height) of the drapes 46A to 46C, detecting cracks in the glass ribbon G, etc. In this case, the monitoring cameras are disposed in positions within the dross box 22 and the annealing furnace 31 where the drapes 46A to 46C or the glass ribbon G can be photographed. The images captured by the monitoring cameras are monitored outside the manufacturing apparatus.

By regulating the level of the drapes 46A to 46C, the distance between each of the drapes 46A to 46C and the glass ribbon G can be kept constant and the rate at which a reducing atmosphere flows through the gap between each of the drapes 46A to 46C and the glass ribbon G can be constant, making it possible to stabilize the quality of the glass ribbon G.

It is preferred to reduce that distance as much as possible to lower the flow rate of the reducing atmosphere.

The manufacturing apparatus may include a monitoring camera for regulating the level (height) of the second partitioning part 47.

REFERENCE SIGNS LIST

1, 2, 2A, 2B, 3 Manufacturing apparatus (float-glass manufacturing apparatus)
11 Float bath
21 Heat treatment furnace
22 Dross box
23A, 23B, 23C Lift-out roll
31 Annealing furnace
32A, 32B, 32C Lehr roll
33 Gas ejection nozzle
34 Guide member
41 First partitioning part
44, 44A, 44B Partitioning member
44b Surface
45 Gas collection nozzle
46A, 46B, 46C Drape
47 Second partitioning part
49 Plate member
50, 51 Holding part
66, 71, 77 Gas discharge part
76 Shielding plate
80 Heat-resistant fibrous sheet
81 Sheet-supporting part
G Glass ribbon L1, L2 Distance
M Molten metal
R Conveyance route

The invention claimed is:

1. A float-glass manufacturing apparatus comprising a float bath to form a glass ribbon on a molten metal and a heat treatment furnace to anneal the glass ribbon, wherein the heat treatment furnace comprises:
a dross box comprising a plurality of lift-out rolls to lift the glass ribbon; an annealing furnace comprising a plurality of lehr rolls to convey the glass ribbon;
a first partitioning part disposed in a bottom portion of the heat treatment furnace so as to lie between the lift-out roll located most downstream in a conveyance direction of the glass ribbon and the lehr roll located most upstream in the conveyance direction;
a second partitioning part disposed over the first partitioning part, the second partitioning part and the first partitioning part being respectively on both sides of a conveyance route to convey the glass ribbon therethrough;
a guide member disposed under the lehr roll located most upstream in the conveyance direction;
a gas ejection nozzle which ejects a sulfur oxide gas from under the conveyance route toward the conveyance route, the gas ejection nozzle is disposed between the lehr roll located most upstream in the conveyance direction and the lehr roll located second most upstream in the conveyance direction; wherein a distance between the lehr roll and the guide member is shorter than a distance between the guide member and a bottom portion of the annealing furnace; and
the lowest end portion of the guide member lies below the gas ejection nozzle,
a gas discharge part is disposed upstream in the conveyance direction from the gas ejection nozzle, and
a gas collection nozzle is disposed at an upper end portion of the first partitioning part.

2. The float-glass manufacturing apparatus according to claim 1, wherein the guide member is disposed so that a lower end portion thereof lies below the gas ejection nozzle.

3. The float-glass manufacturing apparatus according to claim 1, wherein the second partitioning part is a drape hung and held by an external wall of the heat treatment furnace, the drape comprising a pair of holding parts and a plate member, the pair of holding parts holding the plate member therebetween.

4. The float-glass manufacturing apparatus according to claim 1, which comprises a heat-resistant fibrous sheet provided to a conveyance-direction upstream-side upper portion of the first partitioning part so as to face a lower surface of the glass ribbon,
wherein the heat-resistant fibrous sheet is disposed throughout the entire width of the glass ribbon along the direction perpendicular to both the vertical direction and the conveyance direction so that an upper end of the heat-resistant fibrous sheet lies nearer to the lower surface of the glass ribbon than an upper end of the first partitioning part.

5. The float-glass manufacturing apparatus according to claim 4, wherein the heat-resistant fibrous sheet is a felt sheet comprising carbon fibers.

6. The float-glass manufacturing apparatus according to claim 1, wherein the guide member is disposed under the lehr roll located most upstream in the conveyance direction with a gap between the guide member and the lehr roll.

7. The float-glass manufacturing apparatus according to claim 1, wherein the guide member comprises silica-alumina ceramic.

8. The float-glass manufacturing apparatus according to claim 1, wherein the guide member comprises a metallic material.

9. A float-glass manufacturing apparatus comprising a float bath to form a glass ribbon on a molten metal and a heat treatment furnace to anneal the glass ribbon, wherein the heat treatment furnace comprises:
a dross box comprising a plurality of lift-out rolls to lift the glass ribbon; an annealing furnace comprising a plurality of lehr rolls to convey the glass ribbon;
a first partitioning part disposed in a bottom portion of the heat treatment furnace so as to lie between the lift-out roll located most downstream in a conveyance direction of the glass ribbon and the lehr roll located most upstream in the conveyance direction;
a second partitioning part disposed over the first partitioning part, the second partitioning part and the first partitioning part being respectively on both sides of a conveyance route to convey the glass ribbon therethrough;
a gas ejection nozzle which ejects a sulfur oxide gas from under the conveyance route toward the conveyance route;
a gas discharge part disposed upstream in the conveyance direction from the gas ejection nozzle, wherein the heat treatment furnace comprises a shielding plate to partition a space between a bottom portion of the annealing furnace and the gas discharge part; the shielding plate is connected to a bottom portion of the gas discharge part; and
a gas collection nozzle is disposed at an upper end portion of the first partitioning part.

10. The float-glass manufacturing apparatus according to claim 9, wherein the gas discharge part is disposed under the conveyance route.

11. The float-glass manufacturing apparatus according to claim 9, wherein the first partitioning part comprises a partitioning member disposed so as to face the conveyance route, and the gas discharge part is disposed downstream in the conveyance direction from a conveyance-direction upstream-side surface of the partitioning member.

12. The float-glass manufacturing apparatus according to claim 9, wherein the gas discharge part is disposed between the first partitioning part and the lehr roll located most upstream in the conveyance direction.

13. The float-glass manufacturing apparatus according to claim 9, wherein the second partitioning part is a drape hung and held by an external wall of the heat treatment furnace, the drape comprising a pair of holding parts and a plate member, the pair of holding parts holding the plate member therebetween.

14. The float-glass manufacturing apparatus according to claim 9, which comprises a heat-resistant fibrous sheet provided to a conveyance-direction upstream-side upper portion of the first partitioning part so as to face a lower surface of the glass ribbon,
wherein the heat-resistant fibrous sheet is disposed throughout the entire width of the glass ribbon along the direction perpendicular to both the vertical direction and the conveyance direction so that an upper end of the heat-resistant fibrous sheet lies nearer to the lower surface of the glass ribbon than an upper end of the first partitioning part.

15. The float-glass manufacturing apparatus according to claim 9, wherein the gas discharge part comprises a first box and a second box beneath the first box so that an upper wall of the second box is integrated with a lower wall of the first box, the first box has a slit an upper end portion of a side wall facing the upstream side, the slip extends in a direction perpendicular to the conveyance direction; an upper surface of the second box has a plurality of perforations extending in the direction perpendicular to the conveyance direction.

16. A float-glass manufacturing method comprising forming a glass ribbon on a molten metal in a float bath and annealing the glass ribbon in a heat treatment furnace, wherein in the heat treatment furnace, the glass ribbon is lifted in a dross box using a plurality of lift-out rolls and is conveyed in an annealing furnace using a plurality of lehr rolls, a first partitioning part and a second partitioning part are respectively on both sides of a conveyance route to convey the glass ribbon therethrough, in which the first partitioning part is disposed in a bottom portion of the heat treatment furnace so as to lie between the lift-out roll located most downstream in the conveyance direction of the glass ribbon and the lehr roll located most upstream in the conveyance direction, and the second partitioning part is disposed over the first partitioning part, a sulfur oxide gas is ejected by a gas ejection nozzle from under the conveyance route toward the conveyance route, a gas discharge part is disposed upstream in the conveyance direction from the gas ejection nozzle, and a distance from the conveyance route to the first partitioning part or a distance from the conveyance route to the second partitioning part is regulated on the basis of results of detection with a gas collection nozzle disposed at an upper portion of the first partitioning part.

\* \* \* \* \*